US009783042B2

(12) United States Patent
Kurokawa

(10) Patent No.: US 9,783,042 B2
(45) Date of Patent: Oct. 10, 2017

(54) WORKING VEHICLE

(71) Applicant: YANMAR CO., LTD., Osaka-shi, Osaka (JP)

(72) Inventor: Yoshiaki Kurokawa, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 0 days.

(21) Appl. No.: 15/102,742

(22) PCT Filed: Dec. 10, 2014

(86) PCT No.: PCT/JP2014/082731
 § 371 (c)(1),
 (2) Date: Jun. 8, 2016

(87) PCT Pub. No.: WO2015/087929
 PCT Pub. Date: Jun. 18, 2015

(65) Prior Publication Data
 US 2016/0311314 A1    Oct. 27, 2016

(30) Foreign Application Priority Data

Dec. 11, 2013 (JP) .................................. 2013-256333

(51) Int. Cl.
 *B60K 13/04*   (2006.01)
 *E02F 9/08*    (2006.01)
 (Continued)

(52) U.S. Cl.
 CPC .............. *B60K 13/04* (2013.01); *A01B 76/00* (2013.01); *E02F 9/0866* (2013.01);
 (Continued)

(58) Field of Classification Search
 CPC ........ B60K 11/00; B60K 13/04; B62D 25/10; A01B 76/00
 See application file for complete search history.

(56) References Cited

U.S. PATENT DOCUMENTS 5,564,514 A * 10/1996 Knight .................. B62D 25/10
                                                        180/69.21
6,068,675 A *  5/2000 Tsuda ..................... B62D 25/10
                                                        123/198 E (Continued)

FOREIGN PATENT DOCUMENTS

EP    1103448 A1   5/2001
EP    1787896 A1   5/2007

(Continued)

*Primary Examiner* — Hau Phan
(74) *Attorney, Agent, or Firm* — Norris McLaughlin & Marcus, P.A.

(57) ABSTRACT

An engine device of a working vehicle is capable of easily enhancing heat-retaining properties of a first case or a second case, and capable of easily forming, between an outer top plate and an inner top plate, a heat shield space in which a differential pressure sensor can be installed. The working vehicle includes an operation cabin on which an operator rides, the first case for removing particulate matter in exhaust gas in an engine, the second case for removing nitrogen oxide in exhaust gas of the engine, and a hood for covering an upper surface of the engine, and a top plate portion of the hood opposed to one or both of the first case and the second case placed on the upper surface of the engine is formed into a double structure from the outer top plate and the inner top plate.

7 Claims, 9 Drawing Sheets

(51) Int. Cl.
*F01N 3/10* (2006.01)
*F01N 13/00* (2010.01)
*A01B 76/00* (2006.01)
*F01N 3/021* (2006.01)
*F01N 3/20* (2006.01)
*F01N 3/023* (2006.01)

(52) U.S. Cl.
CPC .......... *E02F 9/0883* (2013.01); *E02F 9/0891* (2013.01); *F01N 3/021* (2013.01); *F01N 3/103* (2013.01); *F01N 3/2066* (2013.01); *F01N 13/008* (2013.01); *B60Y 2200/221* (2013.01); *F01N 3/023* (2013.01); *F01N 3/206* (2013.01); *F01N 2470/00* (2013.01); *F01N 2470/14* (2013.01); *F01N 2610/02* (2013.01); *F01N 2610/1406* (2013.01)

(56) References Cited

U.S. PATENT DOCUMENTS

| | | | | |
|---|---|---|---|---|
| 8,371,408 B2* | 2/2013 | Kawashiri | .............. | B62D 25/10 180/69.21 |
| 8,720,638 B1* | 5/2014 | Nakagami | .............. | B60K 11/00 180/309 |
| 2002/0017408 A1* | 2/2002 | Oshikawa | .............. | B60K 11/08 180/69.2 |
| 2008/0011532 A1 | 1/2008 | Ayabe | | |
| 2009/0048734 A1* | 2/2009 | Iwai | ........................ | B60R 21/38 701/36 |
| 2010/0186381 A1 | 7/2010 | Charles et al. | | |
| 2010/0196219 A1 | 8/2010 | Endo et al. | | |
| 2010/0301638 A1* | 12/2010 | Hinshaw | .............. | F02M 35/164 296/208 |
| 2011/0283687 A1 | 11/2011 | Dobler et al. | | |
| 2013/0030660 A1* | 1/2013 | Fujimoto | ............ | F02N 11/0803 701/50 |
| 2013/0213725 A1* | 8/2013 | Togo | ........................ | B60K 5/00 180/309 |
| 2014/0070569 A1* | 3/2014 | Schmitz | ................. | B62D 25/10 296/193.11 |
| 2014/0305110 A1* | 10/2014 | Himoto | ................. | E02F 9/0833 60/324 |

FOREIGN PATENT DOCUMENTS

| | | |
|---|---|---|
| JP | 2001-171563 | 6/2001 |
| JP | 2003-020936 A | 1/2003 |
| JP | 2004-256006 | 9/2004 |
| JP | 2006-062425 | 3/2006 |
| JP | 2008-240677 | 10/2008 |
| JP | 2008-240678 A | 10/2008 |
| JP | 2009-074420 | 4/2009 |
| JP | 2011-230638 | 11/2011 |
| JP | 2013-018325 | 1/2013 |
| JP | 2013-151185 | 8/2013 |
| JP | 2013-173428 | 9/2013 |
| WO | 2013/115398 A1 | 8/2013 |

\* cited by examiner

WORKING VEHICLE

BACKGROUND OF THE INVENTION

The present invention relates to a working vehicle such as an agricultural machinery (tractor, combine-harvester) or construction equipment (bulldozer, hydraulic excavator, loader) provided with an engine, and more particularly, to a working vehicle such as a tractor provided with an exhaust gas purification device which removes particulate matter (soot, particulate) included in exhaust gas or nitrogen oxides (NOx) included in exhaust gas.

In a working vehicle such as a tractor and a wheel loader, to enhance efficiency of a maintenance operation of an engine placed in a front portion of a traveling machine body, an open/close fulcrum shaft is placed in a rear portion of a hood which covers the engine, and the hood is turned around the open/close fulcrum shaft. Further, there is a conventionally known technique in which a filter case provided therein with a diesel particulate filter and a catalyst case provided therein with a urea selective reduction type catalyst as an exhaust gas purification device (exhaust gas post-processing device) are provided in an exhaust gas passage of a diesel engine, exhaust gas is introduced into the filter case and the catalyst case, and exhaust gas discharged from the diesel engine is purified (see Japanese Patent Application Laid-open No. 2009-74420 or U.S. Patent Application Laid-open No. 2011/283687 for example).

SUMMARY OF THE INVENTION

When the filter case or the catalyst case is assembled onto an upper portion of an engine for example, it is necessary to cool the engine and also to secure temperature of exhaust gas of the filter case or the catalyst case. Therefore, there is a problem that temperature around the upper portion of the engine is prone to become high and a hood is inappropriately heated, for example. When a sensor which detects pressure or temperature of exhaust gas of the filter case or the catalyst case is provided, if the sensor or a harness is assembled near the filter case or the catalyst case, there is a problem that the sensor or the harness is prone to be damaged by exhaust heat and durability of the sensor or the harness cannot be enhanced, for example. In addition, when a catalyst case is assembled such that it is separated away from an engine as in Patent Document 2, since an exhaust gas pipe through which exhaust gas is supplied from the engine to the catalyst case is formed from a support member which supports the catalyst case on a traveling machine body, it is necessary to form the support member into a special structure, and there is a problem that manufacturing costs cannot easily be reduced, for example.

Hence, it is an object of the present invention to provide a working vehicle improved in view of these circumstances.

To achieve the above object, a first aspect of the invention provides a working vehicle including an operation portion on which an operator rides, a first case for removing particulate matter in exhaust gas of an engine, and a second case for removing nitrogen oxide in exhaust gas of the engine, wherein the working vehicle further includes a hood for covering an upper surface of the engine, and a top plate portion of the hood opposed to one or both of the first case and the second case placed on the upper surface of the engine is formed into a double structure from an outer top plate and an inner top plate.

According to a second aspect of the invention, in the working vehicle of the first aspect, the working vehicle further including an exhaust gas differential pressure sensor or an exhaust gas temperature sensor for detecting exhaust gas pressure or exhaust gas temperature of the first case or the second case, and a sensor bracket for supporting the exhaust gas differential pressure sensor or a harness connector, wherein the sensor or the harness connector is placed in a heat shield space between the outer top plate and the inner top plate through the sensor bracket.

According to a third aspect of the invention, in the working vehicle of the first aspect, a rear end of a front/rear connection frame is connected to a rear frame which stands on a traveling machine body on a side of the operation portion, a front end of the front/rear connection frame is connected to a front frame which stands on the traveling machine body on a side of a radiator, the hood is supported by the rear frame through an open/close fulcrum shaft, the rear frame is provided with a hood support frame body through the open/close fulcrum shaft, and the outer top plate and the inner top plate are stretched from one end to the other end of the hood support frame body.

According to a fourth aspect of the invention, in the working vehicle of the first aspect, the working vehicle further including a urea mixing pipe for connecting the second case to the first case, and a urea water tank for supplying urea water to the urea mixing pipe, wherein the first case, the second case, and the urea mixing pipe are placed near a lower surface of the inner top plate, and the urea water tank is placed on the traveling machine body, on which the engine is provided, on a lower side of the operation portion.

The first aspect of the invention provides a working vehicle including an operation portion on which an operator rides, a first case for removing particulate matter in exhaust gas of an engine, and a second case for removing nitrogen oxide in exhaust gas of the engine, wherein the working vehicle further includes a hood for covering an upper surface of the engine, and a top plate portion of the hood opposed to one or both of the first case and the second case placed on the upper surface of the engine is formed into a double structure from an outer top plate and an inner top plate. Therefore, it is possible to easily prevent a hood from being inappropriately heated, and to easily enhance heat-retaining properties of the first case or the second case. In addition, it is possible to easily form, between the outer top plate and the inner top plate, a heat shield space in which a differential pressure sensor and the like can be placed.

According to the second aspect of the invention, the working vehicle further including an exhaust gas differential pressure sensor or an exhaust gas temperature sensor for detecting exhaust gas pressure or exhaust gas temperature of the first case or the second case, and a sensor bracket for supporting the exhaust gas differential pressure sensor or a harness connector, wherein the sensor or the harness connector is placed in a heat shield space between the outer top plate and the inner top plate through the sensor bracket. Therefore, it is possible to easily reduce influence of exhaust heat of the engine or the cases exerted on the sensor or the harness, and it is possible to enhance durability of the sensor or the harness.

According to the third aspect of the invention, a rear end of a front/rear connection frame is connected to a rear frame which stands on a traveling machine body on a side of the operation portion, a front end of the front/rear connection frame is connected to a front frame which stands on the traveling machine body on a side of a radiator, the hood is supported by the rear frame through an open/close fulcrum shaft, the rear frame is provided with a hood support frame body through the open/close fulcrum shaft, and the outer top plate and the inner top plate are stretched from one end to the other end of the hood support frame body. Therefore, the outer top plate and the inner top plate can be placed with high rigidity through the hood support frame body and the rear frame, the outer top plate can be made of resin molding material which has poor heat resistance but which is easily machined, outward appearance can be enhanced, the inner top plate can be made of simple metal plate-shaped heat resistance material, and heat resistance of the hood can be enhanced.

According to the fourth aspect of the invention, the working vehicle further including a urea mixing pipe for connecting the second case to the first case, and a urea water tank for supplying urea water to the urea mixing pipe, wherein the first case, the second case, and the urea mixing pipe are placed near a lower surface of the inner top plate, and the urea water tank is placed on the traveling machine body, on which the engine is provided, on a lower side of the operation portion. Therefore, the first case, the second case, and the urea mixing pipe can compactly be supported on an upper surface of the engine.

DETAILED DESCRIPTION OF THE INVENTION

Figure 1:
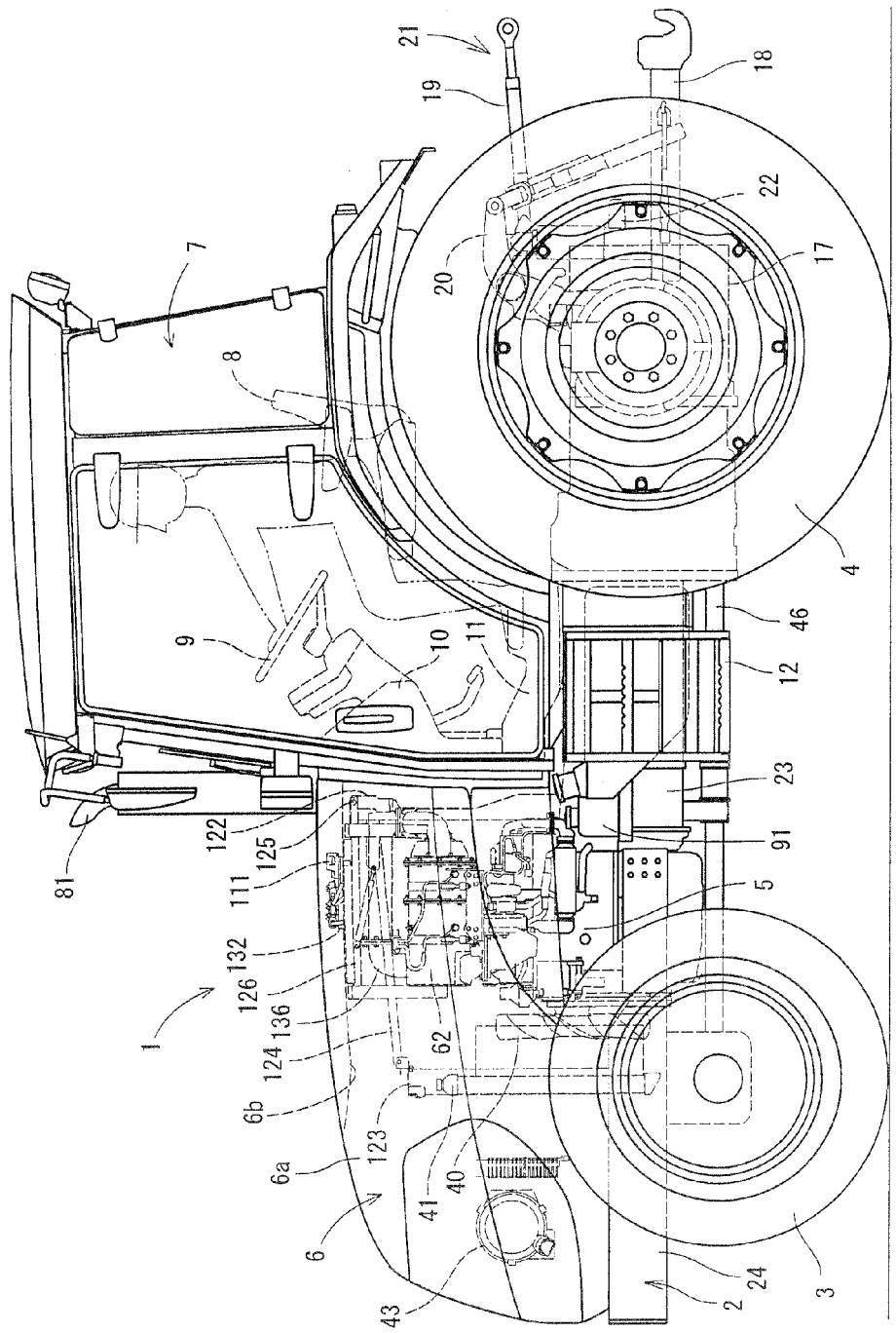
FIG. 1 is a left side view of a tractor showing a first embodiment.

A first embodiment in which the present invention is embodied will be described based on the drawings (FIGS. 1 to 6). First, an agricultural working tractor 1 provided with a diesel engine will be described with reference to FIGS. 1 to 5. A cultivator (not shown) or the like is attached to the agricultural working tractor 1 as a working vehicle shown in FIGS. 1 to 5, and the agricultural working tractor 1 is configured to carry out a cultivating operation to cultivate a field, for example. In the following description, a left side with respect to a forward traveling direction of the tractor 1 is simply called a left side, and a right side with respect to the forward traveling direction is similarly simply called a right side.

As shown in FIGS. 1 to 5, the agricultural working tractor 1 as the working vehicle includes a pair of right and left front wheels 3 and a pair of right and left rear wheels 4, and these wheels 3 and 4 support a traveling machine body 2. A diesel engine 5 is provided in a front portion of the traveling machine body 2, the diesel engine 5 drives the rear wheels 4 and the front wheels 3, thereby making the agricultural working tractor 1 run forward and backward. An upper surface and right and left side surfaces of the diesel engine 5 are covered with a hood 6 which can open and close.

An operation cabin 7 as an operation portion on which an operator rides is placed on a rear portion of the hood 6 of an upper surface of the traveling machine body 2. A front column 10 is provided in the cabin 7. The front column 10 includes a steering seat 8 on which the operator sits and a steering handle 9 as steering means. Right and left platform steps 12 are provided on outer sides of a boarding step 11 provided on a bottom of the cabin 7. Right and left brake pedals 13, a clutch pedal 14, a change pedal 15, a forward/backward travelling switching lever 16, and the like are placed on the front column 10 as steering devices.

The traveling machine body 2 includes a transmission case 17 which speed-shifts output from the diesel engine 5 and transmits the output to the rear wheels 4 (front wheels 3). A cultivator (not shown) and the like are connected to a rear portion of the transmission case 17 through traction mechanisms 21 such as right and left lower links 18, a top link 19, and right and left lift arms 20 such that the cultivator can move up and down, and the cultivator and the like are driven by a PTO shaft 22 provided on a rear surface of the transmission case 17. The traveling machine body 2 of the tractor 1 is composed of the diesel engine 5, the transmission case 17, a clutch case 23 which connects the diesel engine 5 and the transmission case 17 to each other, and a front chassis 24 which extends forward from the diesel engine 5.

Figure 3:
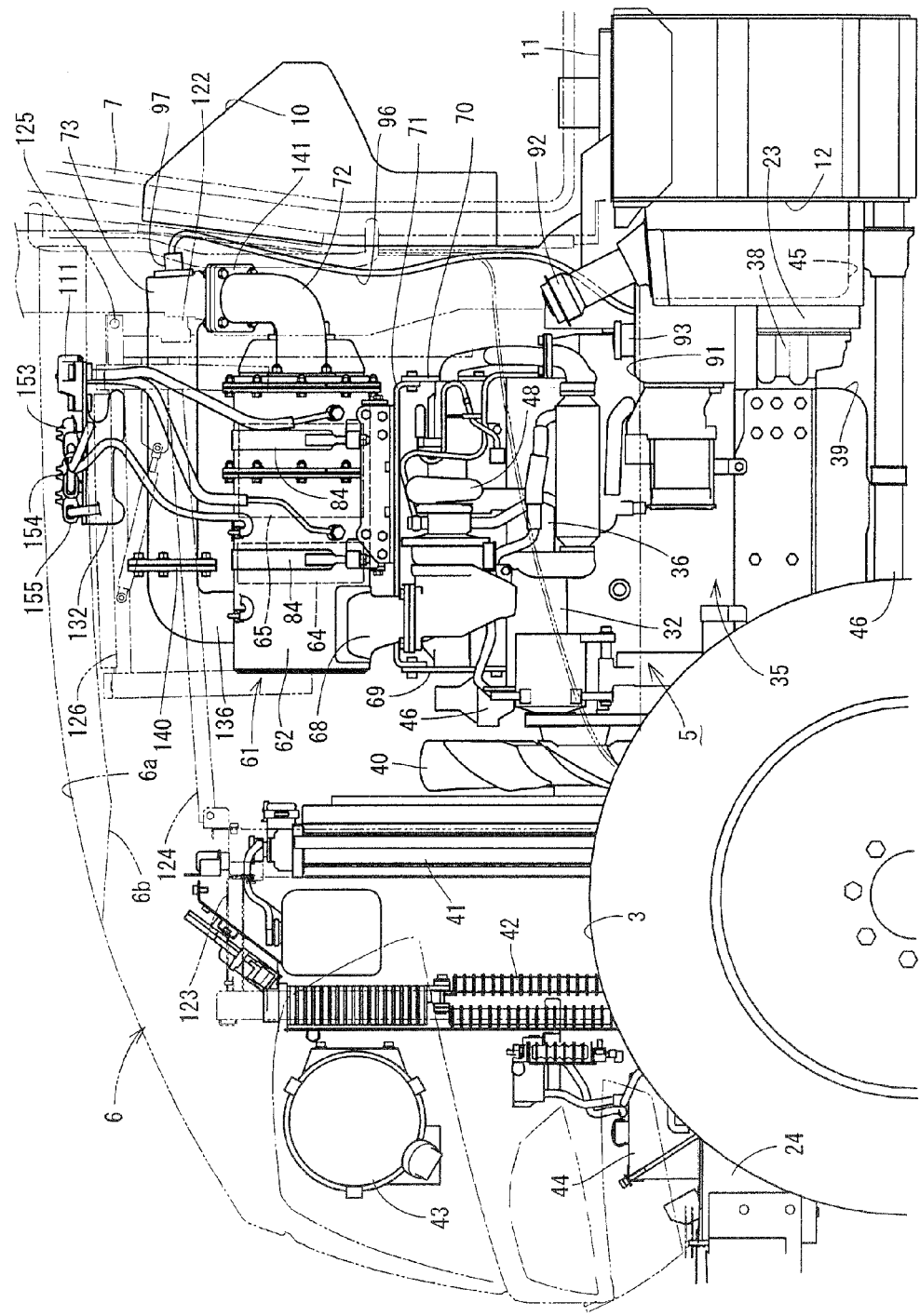
FIG. 3 is a left side view of an engine portion.
Figure 4:
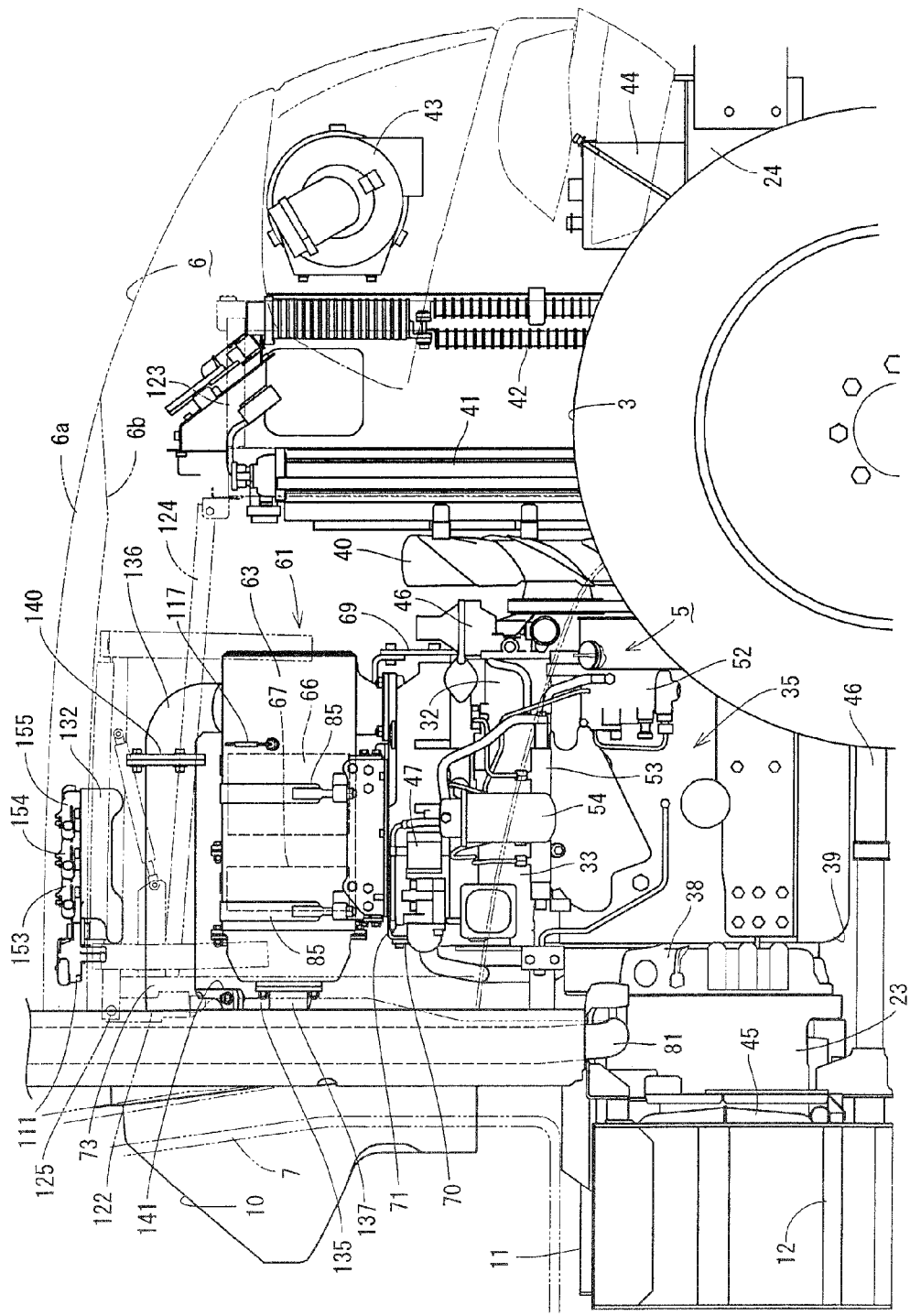
FIG. 4 is a right side view of the engine portion.
Figure 5:
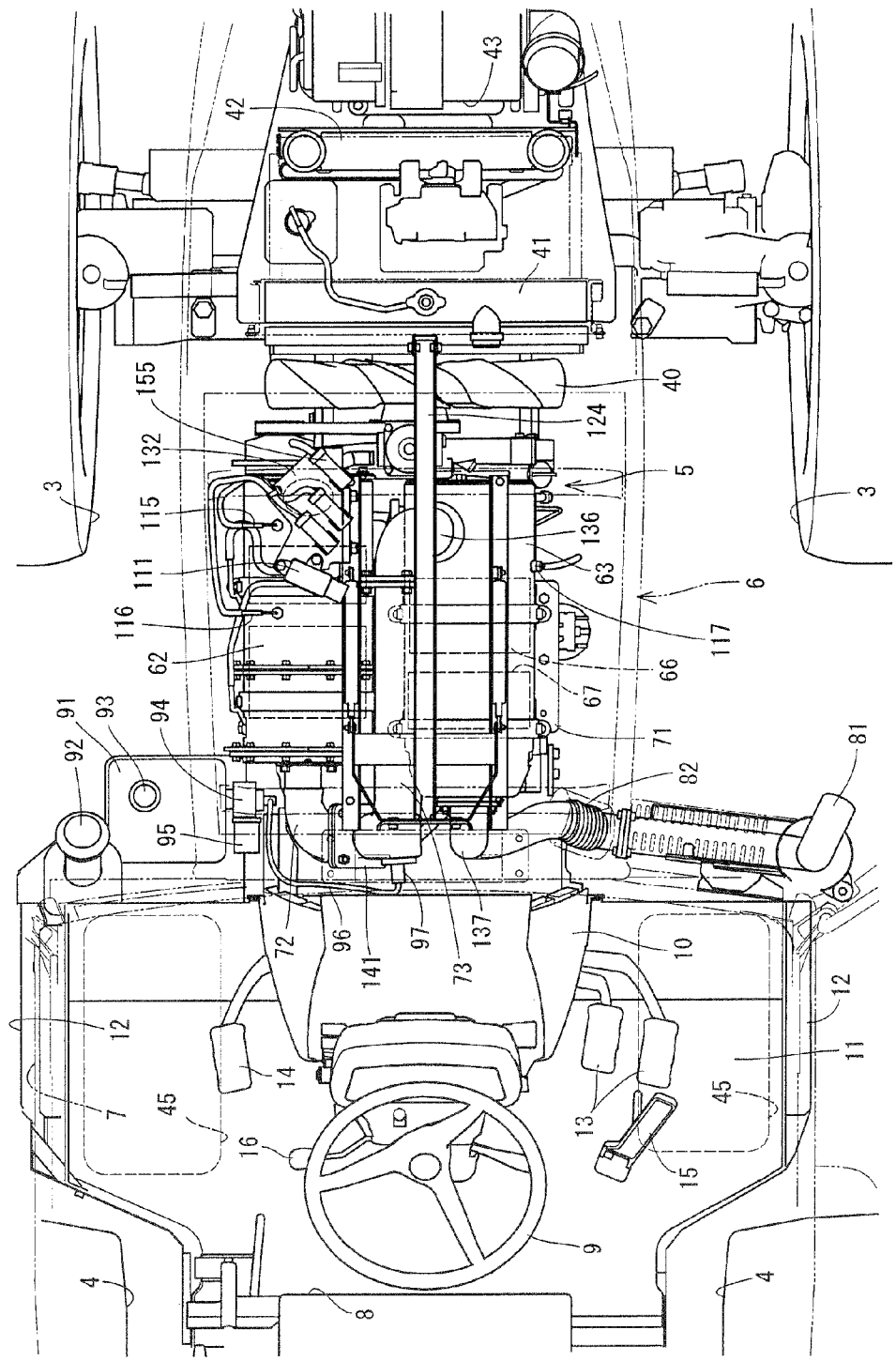
FIG. 5 is a plan view of the engine portion.

Next, the diesel engine 5 and an exhaust gas discharging structure will be described with reference to FIGS. 3 to 5. As shown in FIGS. 3 to 5, an intake manifold 33 is placed on one of side surfaces of a cylinder head 32 of the diesel engine 5. The cylinder head 32 is mounted on a cylinder block 35. An engine output shaft (crankshaft) and a piston (both not shown) are provided in the cylinder block 35. A discharge manifold 36 is placed on the other side surface of the cylinder head 32.

As shown in FIGS. 3 to 5, a front end of the clutch case 23 is fixed to a rear surface of the engine through a flywheel housing 38. An oil pan 39 is placed on a lower surface of the cylinder block 35, a cooling fan 40 is placed on a front surface of the cylinder block 35, and a radiator 41 is placed such that it is opposed to the cooling fan 40. An oil cooler 42, an air cleaner 43, and a battery 44 are placed on a front chassis 23 in front of the radiator 41. A front wheel drive shaft 46 is placed below the clutch case 23. The front wheel drive shaft 46 takes out power of the diesel engine 5 from the transmission case 17 toward the front wheels 3.

As shown in FIG. 4, an exhaust gas recirculation device (EGR) 47 for taking in recirculation exhaust gas is placed in the intake manifold 33. The air cleaner 43 is connected to the intake manifold 33 through an exhaust gas recirculation device 47. Dust in outside air is removed and the outside air is purified by the air cleaner 43. The outside air is sent to the intake manifold 33 and supplied to cylinders of the diesel engine 5.

According to this configuration, a portion of exhaust gas discharged from the diesel engine 5 to the discharge manifold 36 flows back to the cylinders of the diesel engine 5 from the intake manifold 33 through the exhaust gas recirculation device 47. According to this, combustion temperature of the diesel engine 5 drops, a discharge amount of nitrogen oxides (NOx) from the diesel engine 5 reduces, and fuel economy of the diesel engine 5 is enhanced.

The cooling fan 40 cools the diesel engine 5. As shown in FIG. 4, a fuel pump 52 and a common rail 53 which connect fuel tanks 45 to injectors (not shown) of the four cylinders of the diesel engine 5 are provided. The common rail 53 and a fuel filter 54 are placed in the cylinder head 32 on the side where the intake manifold 33 is placed. The fuel pump 52 is placed in the cylinder block 35 below the intake manifold 33. The right and left fuel tanks 45 are provided on right and left sides of the clutch case 23 on the underside of the boarding step 11.

High pressure fuel is temporarily stored in the common rail 53, the high pressure fuel in the common rail 53 is supplied into the cylinders of the diesel engine 5, opening and closing operations of fuel injection valves of the injectors are respectively controlled, and high pressure fuel in the common rail 53 is injected into the cylinders of the diesel engine 5. That is, by electronically controlling the fuel injection valves of the injectors, injection pressure, injection timing, and injection period (injection amount) of fuel can be controlled precisely. Therefore, it is possible to reduce nitrogen oxides (NOx) discharged from the diesel engine 5.

As shown in FIGS. 3 to 5, as an exhaust gas purification device 61 for purifying exhaust gas discharged from the cylinders of the diesel engine 5, there are provided a first case 62 as a diesel particulate filter (DPF) for removing particulate matter in exhaust gas of the diesel engine 5, and a second case 63 as a urea selective catalyst reduction (SCR) system for removing nitrogen oxides in exhaust gas of the diesel engine 5. As shown in FIG. 5, an oxidation catalyst 64 and a soot filter 65 are provided in the first case 62. A SCR catalyst 66 and an oxidation catalyst 67 for urea selective catalyst reduction are provided in the second case 63.

Exhaust gas discharged from the cylinders of the diesel engine 5 into the discharge manifold 36 is discharged outside of the vehicle through the exhaust gas purification device 61. Carbon monoxide (CO), hydrocarbon (HC), particulate matter (PM), and nitrogen oxides (NOx) in exhaust gas of the diesel engine 5 are reduced by the exhaust gas purification device.

The first case 62 is formed into a laterally long cylindrical shape which extends in a direction (longitudinal direction of machine body) parallel to the output shaft (crankshaft) of the diesel engine 5 as viewed from above. One end of the cylindrical shape of the first case 62 is provided with a DPF inlet pipe 68 through which exhaust gas is sucked. Front and rear portion of a support table body 71 are connected to front and rear surfaces of the cylinder head 32 of front and rear surfaces of the diesel engine 5 through a front support leg 69 and a rear support leg 70, and the first case 62 and the second case 63 are placed on an upper surface of the support table body 71. That is, the support table body 71 is mounted on an upper surface of the diesel engine 5 through the front support leg 69 and the rear support leg 70. The first case 62 and the second case 63 are supported in parallel to the discharge manifold 36 such that longitudinal directions of the cylindrical first case 62 and second case 63 are directed to the longitudinal direction of the diesel engine 5.

The DPF inlet pipe 68 is brought into communication with an exhaust gas outlet of the discharge manifold 36 through a supercharger 48 which forcibly sends air into the diesel engine 5, and exhaust gas of the diesel engine 5 is introduced from the DPF inlet pipe 68 into the first case 62. A DPF outlet pipe 72 through which exhaust gas is discharged is provided on the other end of the cylindrical shape of the first case 62. An inlet of a urea mixing pipe 73 is connected to the DPF outlet pipe 72 of the first case 62, and exhaust gas of the first case 28 is introduced into the urea mixing pipe 73.

Both sides (one end and the other end in a moving direction of exhaust gas) of the second case 63 are provided with a SCR inlet pipe 136 through which exhaust gas is sucked and a SCR outlet pipe 137 through which exhaust gas is discharged. The SCR inlet pipe 136 is connected to the DPF outlet pipe 72 through the urea mixing pipe 73, and exhaust gas of the first case 62 is introduced into the second case 63. In addition, a DPF outlet pipe 135 and the urea mixing pipe 73 are detachably fastened to each other through a bolt by a DPF outlet flange body 141.

The SCR inlet pipe 136 and the urea mixing pipe 73 are detachably connected to each other through a SCR inlet flange body 140. The first case 28, the second case 29, and a urea mixing pipe 39 are integrally connected to each other through the SCR inlet flange body 140 and the DPF outlet flange body 141. Two fastening bands 84 and 85 are attached to upper surfaces of the first case 28 and the second case 29 in a halfway wound manner, and lower ends of the fastening bands 84 and 85 are fastened to the support table body 71 through bolts.

Figure 2:
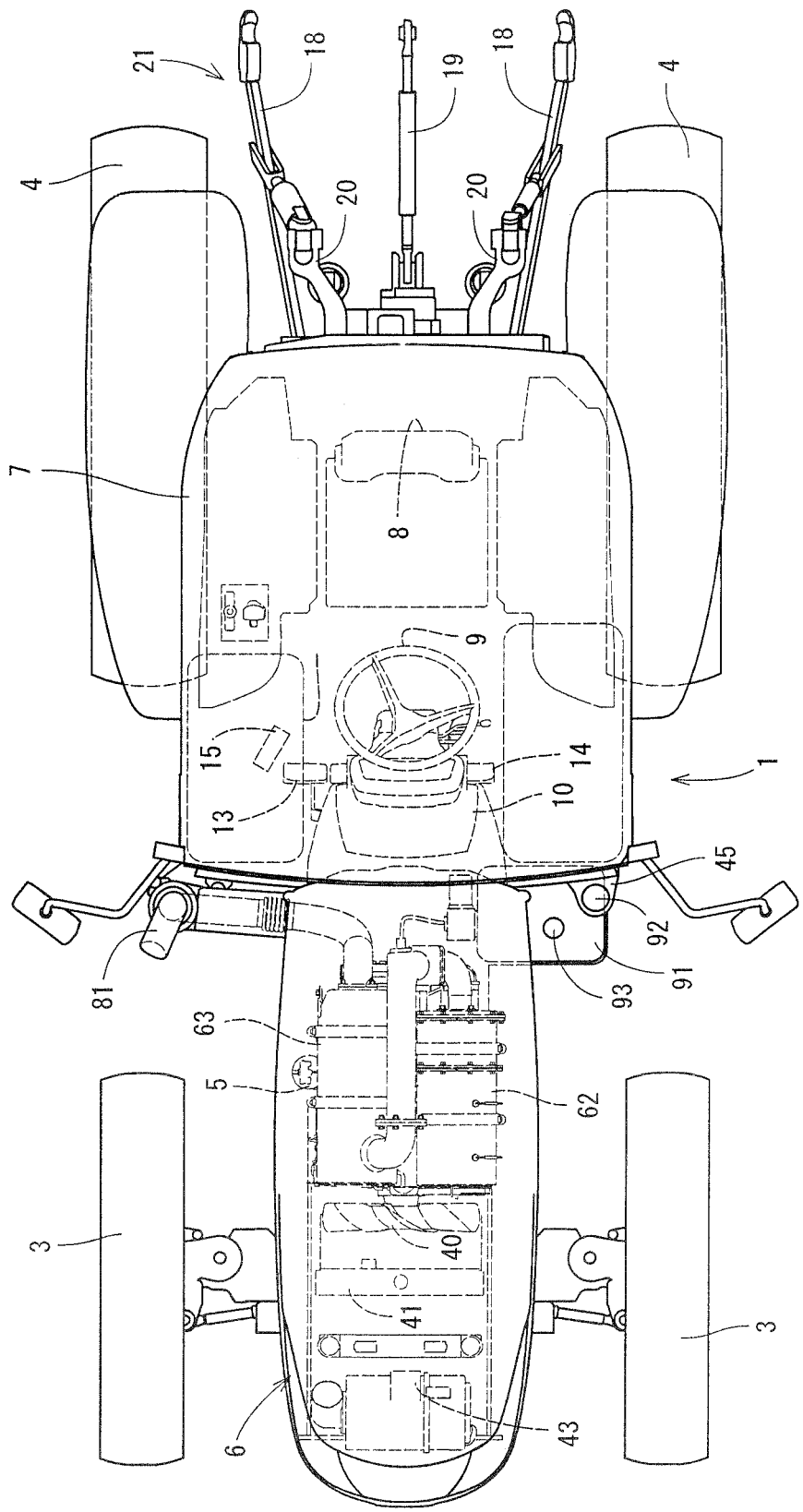
FIG. 2 is a plan view of the tractor.

As shown in FIGS. 1, 2, and 5, a tail pipe 81 stands on a front surface of a right angle corner portion of the operation cabin 7 on a front surface of the operation cabin 7, a lower end of the tail pipe 81 extends toward an interior of a hood 56, a lower end of the tail pipe 81 is connected to the SCR outlet pipe 137 through a bellows-pipe shaped flexible pipe 82, and exhaust gas which is purified by the second case 63 is discharged from the tail pipe 81 toward a location above the operation cabin 7. Mechanical vibration transmitted from the diesel engine 1 to the tail pipe 81 is reduced by connection of the flexible pipe 82. A urea water tank 91 is placed on a left side of the hood 6 on a side opposite from a right side of the front surface of the operation cabin 7 where the tail pipe 81 is placed. That is, the tail pipe 81 is placed on a right side of a rear portion of the hood 6 and the urea water tank 91 is placed on a left side of the rear portion of the hood 6 in an allotted manner.

The urea water tank 91 is placed on the traveling machine body 2 (bottom frame and the like of operation cabin 7) of a left rear portion of the hood 6. An oil hole 92 of the fuel tanks 45 and a water filler 93 of a urea water tank 71 are adjacently provided in a lower portion of a front surface of a left side of the cabin 7. The tail pipe 81 is placed in a right front surface of the operation cabin 7 where incoming/outgoing frequency of an operator is low, and the oil hole 92 and the water filler 93 are placed in a left front surface of the operation cabin 7 where the incoming/outgoing frequency of the operator is high. The operation cabin 7 is configured such that the operator can sit on and leave from the steering seat 8 from any of a left side and a right side of the operation cabin 7.

As shown in FIGS. 3 and 5, there are provided a urea water injection pump 94 for sending urea water solution in the urea water tank 91 under pressure, an electric motor 95 which drives the urea water injection pump 94, and a urea water injection nozzle 97 which is connected to the urea water injection pump 94 through a urea water injection pipe 96. A urea water injection nozzle 76 is mounted on the urea mixing pipe 39 through an injection pedestal 77, and urea water solution is injected from the urea water injection nozzle 76 into the urea mixing pipe 39.

That is, carbon monoxide (CO) and hydrocarbon (HC) in exhaust gas of the diesel engine 5 are reduced by the oxidation catalyst 64 and the soot filter 65 in the first case 62. Next, urea water from the urea water injection nozzle 97 is mixed into exhaust gas from the diesel engine 5 in the urea mixing pipe 73. Nitrogen oxides (NOx) in exhaust gas with which urea water is mixed as ammonia is reduced by the SCR catalyst 66 and the oxidation catalyst 67 in the second case 63, and the nitrogen oxides (NOx) is discharged outside of the vehicle from the tail pipe 81.

The first case 62 includes a differential pressure sensor 111 for detecting a deposition status of particulate matter of the soot filter 65, an upstream gas temperature sensor 115 for detecting exhaust gas temperature on an exhaust gas suction side of the first case 62, and a downstream gas temperature sensor 116 for detecting exhaust gas temperature on an exhaust gas suction side of the soot filter 65. A difference (differential pressure of exhaust gas) between exhaust gas pressure on an inflow side of the soot filter 65 and exhaust gas pressure on an outflow side of the soot filter 65 is detected by the differential pressure sensor 111, and temperature of exhaust gas in the first case 62 is detected by the temperature sensors 115 and 116.

The second case 63 includes a SCR gas temperature sensor 117 for detecting exhaust gas temperature on a suction side of exhaust gas of the SCR catalyst 66, and temperature of exhaust gas in the second case 63 (SCR catalyst 66) is detected by the SCR gas temperature sensor 117. That is, abnormality of temperature of exhaust gas in the cases 62 and 63, for example, is detected based on detection results of the temperature sensors 115, 116, and 117. A remaining amount of particulate matter in exhaust gas collected by the soot filter 65 is proportional to differential pressure of the exhaust gas. Therefore, when an amount of particulate matter remaining in the soot filter 65 increased more than a predetermined value, recycling control (fuel injection control or suction control of diesel engine 5 to raise exhaust gas temperature for example) of the soot filter 65 to reduce the amount of particulate matter of the soot filter 65 is executed based on a detection result of the differential pressure sensor 111.

Next, as shown in FIGS. 3 to 6, a top plate portion of the hood 6 is formed into a double structure from an outer top plate 6a and an inner top plate 6b, the top plate portion is opposed to one or both of the first case 62 and the second case 63, an upper surface of the first case 62 or the second case 63 is covered with the inner top plate 6b. There is provided an engine room frame 121 where the hood 6 is placed. The engine room frame 121 is formed from a rear frame 122 standing on an upper surface of a connecting portion between the clutch case 23 and the flywheel housing 38, a front frame 123 standing on an upper surface of the front chassis 24 which supports the radiator 41, and a front/rear connection frame 124 which connects an upper end of the rear frame 122 and an upper end of the front frame 123 to each other.

A rear end of a hood support frame body 126 is turnably pivotally supported by the rear frame 122 through an open/close fulcrum shaft 125, a front end of the hood support frame body 126 extends toward an upper surface of the diesel engine 5, the hood support frame body 126 is integrally fixed to a lower surface of the inner top plate 6b of the double structure, the outer top plate 6a and the inner top plate 6b are stretched from one end to the other end of the hood support frame body 126, and the hood 6 is supported by the open/close fulcrum shaft. 125 of the rear frame 122 through the hood support frame body 126 in a front opening/closing structure. Gas springs 127 are connected between the rear frame 122 and the hood support frame body 126, and an opening force of the hood 6 is reduced by the gas springs 127.

In addition, as shown in FIGS. 3 to 6, a sensor-installation opening 131 is formed in the inner top plate 6b, a sensor bracket 132 which supports the exhaust gas differential pressure sensor 111 or a harness connector is provided, and a fixing leg of the sensor bracket 132 is fastened and fixed to the hood support frame body 126. The sensor bracket 132 is placed in a heat shield space 130 between the outer top plate 6a and the inner top plate 6b on an inner side of the sensor-installation opening 131. The differential pressure sensor 111 is integrally provided with an electric wiring connector. The differential pressure sensor 111 is mounted on the sensor bracket 132.

One end of an upstream sensor pipe 133 and one end of a downstream sensor pipe 134 are connected to the differential pressure sensor 111. Upstream and downstream sensor pipe boss bodies 151 and 152 are placed in the first case 62 such that the boss bodies 151 and 152 sandwich a soot filter 84 in the first case 62. The other ends of the upstream sensor pipe 133 and the downstream sensor pipe 134 are connected to the sensor pipe boss bodies 151 and 152, respectively.

An electric wiring harness connector 153 of the upstream gas temperature sensor 115, an electric wiring harness connector 154 of the downstream gas temperature sensor 116, and an electric wiring harness connector 155 of the SCR gas temperature sensor 117 are fixed to the sensor bracket 132 such that harness connecting directions of these harness connectors are oriented to the same direction. The differential pressure sensor 111 or the harness connectors 153, 154, and 155 are placed in the heat shield space 130 between the outer top plate 6a and the inner top plate 6b through the sensor bracket 132.

Figure 6:
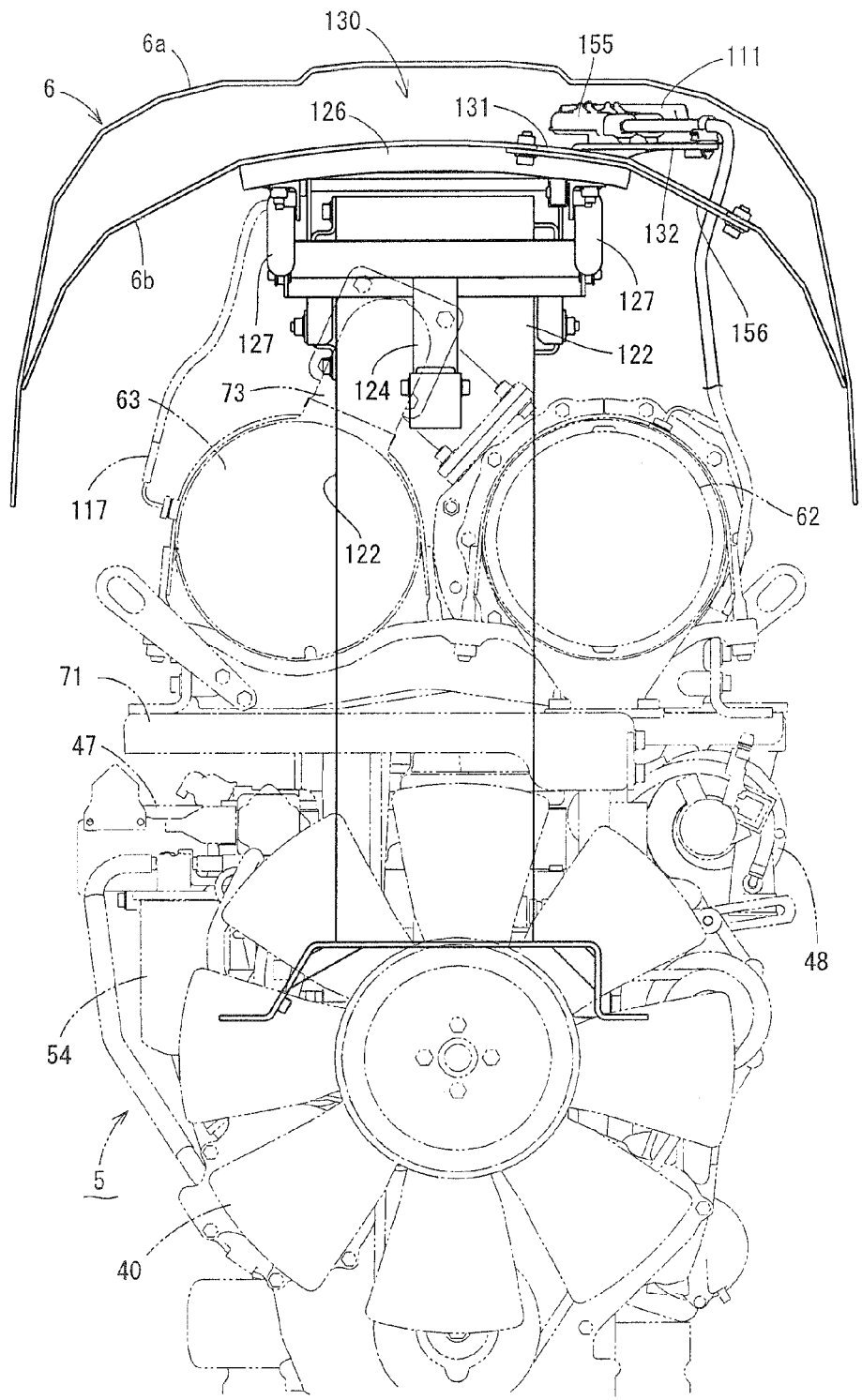
FIG. 6 is an explanatory front view of the engine portion.
Figure 7:
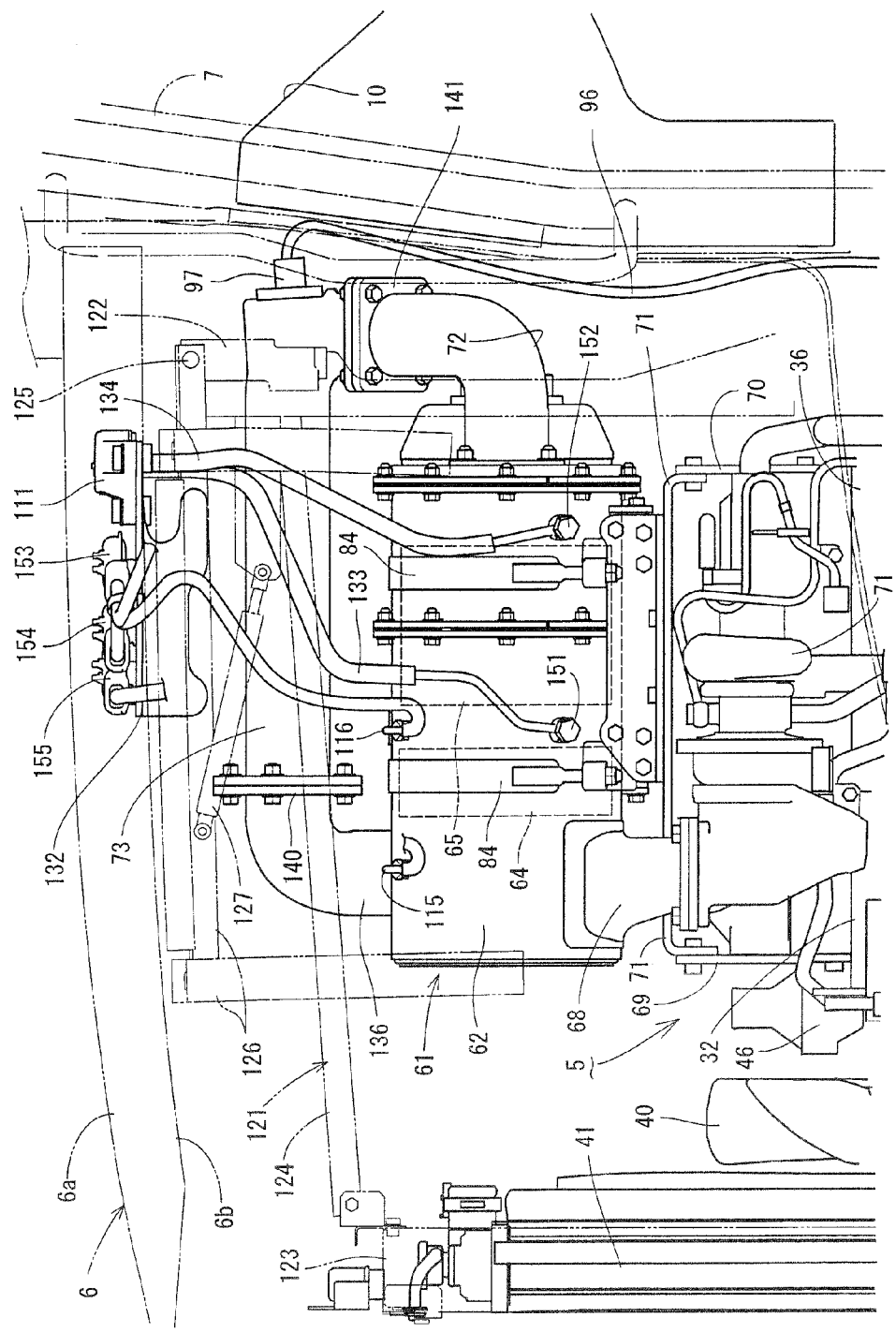
FIG. 7 is an enlarged explanatory view of FIG. 3.
Figure 8:
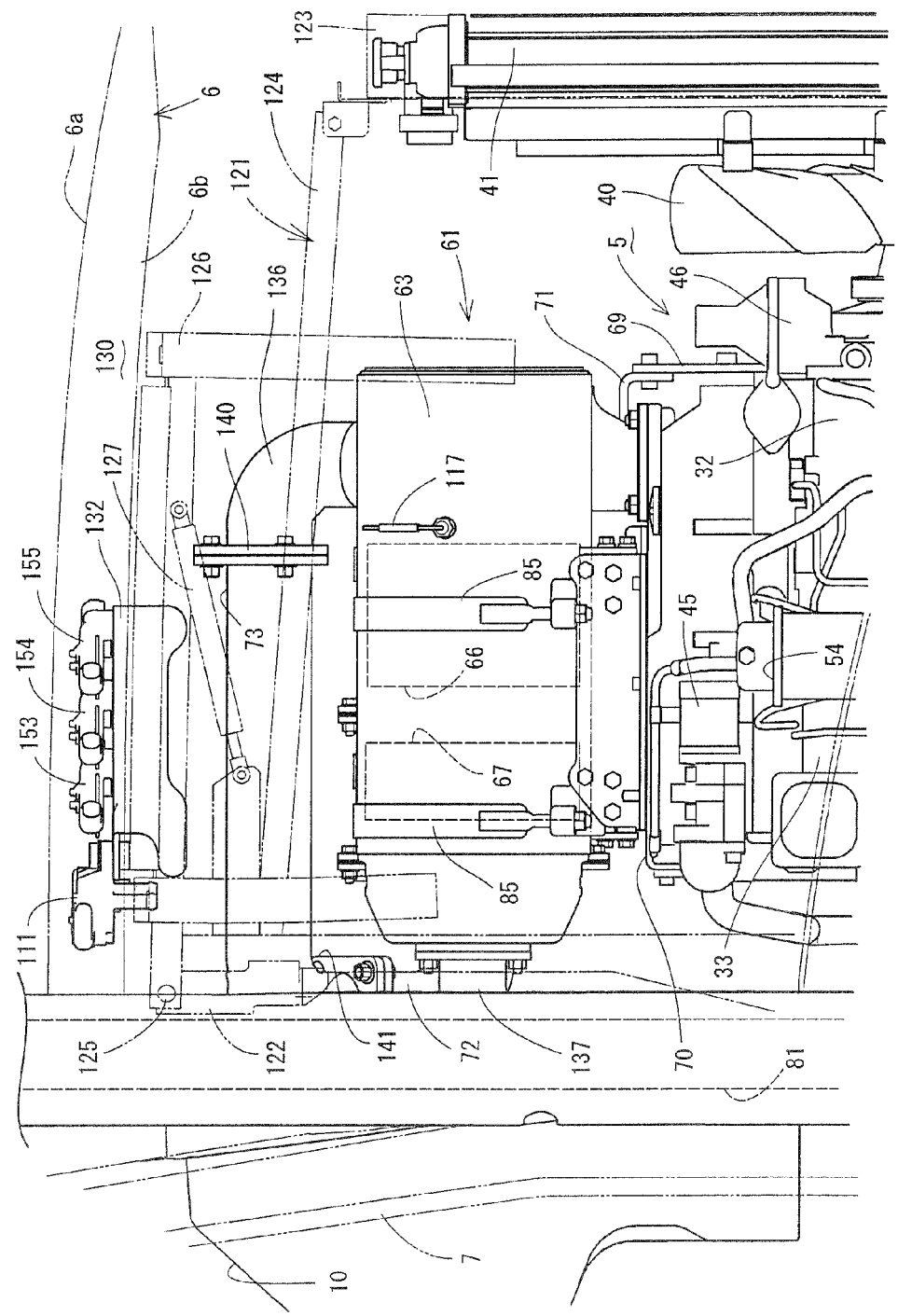
FIG. 8 is an enlarged explanatory view of FIG. 4.
Figure 9:
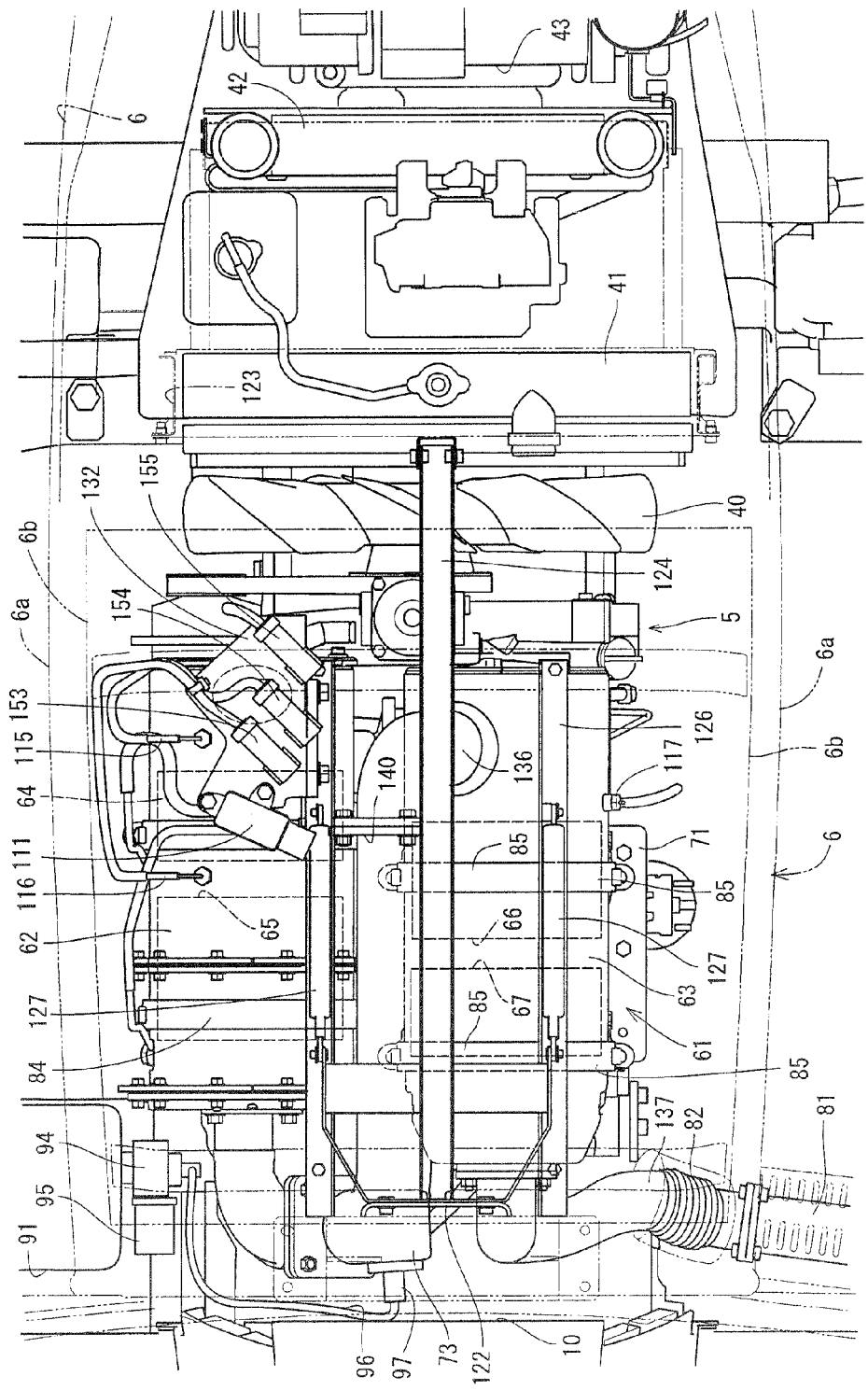
FIG. 9 is an enlarged explanatory view of FIG. 5.

As shown in FIG. 6, the first case 62, the second case 63, and the urea mixing pipe 73 are placed in the vicinity of a lower surface of the inner top plate 6b, there is provided a lid plate body 156 which opens and closes the sensor-installation opening 131, the lid plate body 156 is detachably attached to a lower surface of the inner top plate 6b, and this configuration prevents hot wind on the side of the diesel engine 5 from entering into the heat shield space 130 between the outer top plate 6a and the inner top plate 6b from the sensor-installation opening 131.

As shown in FIGS. 1 and 3 to 9, the working vehicle includes the operation cabin 7 as an operation portion on which an operator rides, the first case 62 for removing particulate matter in exhaust gas of the diesel engine 5, and the second case 63 for removing nitrogen oxides in exhaust gas of the diesel engine 5, and there is provided the hood 6 for covering the upper surface of the diesel engine 5. The top plate portion of the hood 6 which is opposed to one or both of the first case 62 and the second case 63 placed on the upper surface of the diesel engine 5 is formed into the double structure from the outer top plate 6a and the inner top plate 6b. Therefore, it is possible to easily prevent the hood 6 from being inappropriately heated, and it is possible to easily enhance heat-retaining properties of the first case 62 or the second case 63. In addition, the heat shield space 130 where the differential pressure sensor 111 or the like can be placed can easily be formed between the outer top plate 6a and the inner top plate 6b.

As shown in FIGS. 6 to 9, the working vehicle further including the exhaust gas differential pressure sensor 111 or the exhaust gas temperature sensor (upstream gas temperature sensor 115, downstream gas temperature sensor 116, and SCR gas temperature sensor 117) for detecting exhaust gas pressure or exhaust gas temperature of the first case 62 or the second case 63, and the sensor bracket 132 which supports the exhaust gas differential pressure sensor 111 or the harness connectors 153, 154, and 155. The differential pressure sensor 111 or the harness connectors 153, 154, and 155 are placed in the heat shield space 130 between the outer top plate 6a and the inner top plate 6b through the sensor bracket 132. Therefore, it is possible to easily reduce influence of exhaust heat of the diesel engine 5 or the cases 62 and 63 from being exerted to the harness which is connected to the differential pressure sensor 111 or the harness connectors 153, 154, and 155, and it is possible to enhance durability of the differential pressure sensor 111 or the harness.

As shown in FIGS. 6 to 9, the rear end of the front/rear connection frame 124 is connected to the rear frame 122 which stands on the traveling machine body 2 on the side of the operation cabin 7, the front end of the front/rear connection frame 124 is connected to the front frame 123 which stands on the traveling machine body 2 on the side of the radiator 41, and the hood 6 is supported by the rear frame 122 through the open/close fulcrum shaft 125. The rear frame 122 is provided with the hood support frame body 126 through the open/close fulcrum shaft 125, and the outer top plate 6a and the inner top plate 6b are stretched from one end to the other end of the hood support frame body 126. Therefore, the outer top plate 6a and the inner top plate 6b can be installed with high rigidity through the hood support frame body 126 and the rear frame 122, the outer top plate 6a can be made of resin molding material which has poor heat resistance but which is easily machined, outward appearance can be enhanced, the inner top plate 6b can be made of simple metal plate-shaped heat resistance material, and heat resistance of the hood 6 can be enhanced.

As shown in FIGS. 3 to 5, the working vehicle further includes the urea mixing pipe 73 for connecting the second case 63 to the first case 62, and the urea water tank 91 for supplying urea water to the urea mixing pipe 73. The first case 62, the second case 62, and the urea mixing pipe 73 are placed in the vicinity of the lower surface of the inner top plate 6b, and the urea water tank 91 is placed on the traveling machine body 2, on which the diesel engine 5 is placed, on the lower side of the operation cabin 7. Therefore, the first case 62, the second case 63, and the urea mixing pipe 73 can compactly be supported on the upper surface of the diesel engine 5.

The invention claimed is:

1. A working vehicle comprising:
    an operation portion on which an operator rides,
        a first case configured to remove particulate matter in exhaust gas of an engine, a second case configured to remove nitrogen oxide in exhaust gas of the engine, and
        an outlet pipe configured to discharge exhaust gas from the first case, a selective catalyst reduction system inlet pipe configured to take in exhaust gas from the first case,
        a selective catalyst reduction system outlet pipe configured to discharge exhaust gas from the second case, and
        a urea mixing pipe configured to mix urea, wherein
    the working vehicle further includes a hood configured to cover an upper surface of the engine,
    the first case is configured in a tubular shape,
    the outlet pipe for discharging exhaust gas from the first case is provided at one end of the first case,
    an inlet side of the urea mixing pipe is connected to the outlet pipe configured to discharge exhaust gas from the first case,
    the selective catalyst reduction system inlet pipe and the selective catalyst reduction system outlet pipe are, respectively, connected to a first and a second end of the second case,
    the selective catalyst reduction system inlet pipe is operably connected to the outlet pipe configured to discharge exhaust gas from the first case via the urea mixing pipe, and
    the first case and the second case are arranged in parallel to each other above the engine and are covered with the hood.

2. The working vehicle according to claim 1, further comprising a urea water tank configured to supply urea water to the urea mixing pipe, wherein
    the urea water tank is placed on the traveling machine body, on which the engine is provided, on a lower side of the operation portion.

3. The working vehicle according to claim 1, wherein a top plate portion of the hood opposed to one or both of the first case and the second case placed on the upper surface of the engine is formed into a double structure comprising an outer top plate and an inner top plate.

4. The working vehicle according to claim 3, wherein the first case, the second case, and the urea mixing pipe are placed near a lower surface of the inner top plate.

5. The working vehicle according to claim 1, wherein the first case is elongated in a direction parallel to an output shaft of the engine in plan view.

6. A working vehicle comprising an operation portion on which an operator rides, a first case configured to remove particulate matter in an exhaust gas of an engine, and a second case configured to remove nitrogen oxide in the exhaust gas of the engine, wherein
    the working vehicle further includes a hood configured to cover an upper surface of the engine, and wherein a top plate portion of the hood opposed to one or both of the first case and the second case placed on the upper surface of the engine is formed into a double structure comprising an outer top plate and an inner top plate,
    the working vehicle further comprising an exhaust gas differential pressure sensor or an exhaust gas temperature sensor configured to detect exhaust gas pressure or exhaust gas temperature of the first case or the second case, and a sensor bracket configured to support the exhaust gas differential pressure sensor or a harness connector, wherein
    the sensor or the harness connector is placed in a heat shield space between the outer top plate and the inner top plate as supported by the sensor bracket.

7. A working vehicle comprising an operation portion on which an operator rides, a first case configured to remove particulate matter in an exhaust gas of an engine, and a second case configured to remove nitrogen oxide in the exhaust gas of the engine, wherein
    the working vehicle further includes a hood configured to cover an upper surface of the engine, and wherein a top plate portion of the hood opposed to one or both of the first case and the second case placed on the upper surface of the engine is formed into a double structure comprising an outer top plate and an inner top plate, and wherein a rear end of a front/rear connection frame is connected to a rear frame which stands on a traveling machine body on a side of the operation portion, a front end of the front/rear connection frame is connected to a front frame which stands on the traveling machine body on a side of a radiator, the hood is supported by the rear frame through an open/close fulcrum shaft, the rear frame is provided with a hood support frame body through the open/close fulcrum shaft, and the outer top plate and the inner top plate are stretched from one end to another end of the hood support frame body.

* * * * *